United States Patent
Base

[11] Patent Number: 5,954,094
[45] Date of Patent: Sep. 21, 1999

[54] END CAP FOR PROVIDING A FLUID-TIGHT SEAL BETWEEN DISSIMILAR MATERIALS

[75] Inventor: Howard J. Base, Macedonia, Ohio

[73] Assignee: Lufran Incorporated, Streetsboro, Ohio

[21] Appl. No.: 08/936,968

[22] Filed: Sep. 25, 1997

Related U.S. Application Data

[60] Provisional application No. 60/035,479, Jan. 13, 1997.

[51] Int. Cl.$^6$ ........................ F16L 55/10
[52] U.S. Cl. ............. 138/89; 138/96 R; 215/319; 215/321; 220/287
[58] Field of Search ............. 138/89, 90, 96 R, 138/96 T, 114, 103; 215/319, 321, 334, 316; 220/200, 287

[56] References Cited

U.S. PATENT DOCUMENTS

| | | | |
|---|---|---|---|
| 2,034,739 | 3/1936 | Bodor | 215/321 X |
| 2,525,162 | 10/1950 | Wise | 220/287 X |
| 3,141,567 | 7/1964 | Schearer | 220/287 X |
| 3,655,089 | 4/1972 | Tower | 220/287 X |
| 3,807,457 | 4/1974 | Logsdon | 138/89 |
| 4,583,668 | 4/1986 | Maynard, Jr. | 215/319 X |
| 5,048,571 | 9/1991 | Ellis | 138/89 X |
| 5,392,949 | 2/1995 | McKenna | 220/712 |
| 5,560,505 | 10/1996 | Schneider et al. | 215/334 X |
| 5,667,088 | 9/1997 | King et al. | 215/334 X |

*Primary Examiner*—Patrick Brinson
*Attorney, Agent, or Firm*—Fay, Sharpe, Beall, Fagan, Minnich & McKee

[57] ABSTRACT

A new and improved end-cap for use with a fluid heater is disclosed. The end-cap includes an end wall, a first groove in the end wall for receiving a first tube, a second groove in the end wall located radially inward of the first groove for receiving a second tube, and a third groove in the end wall located radially inward of the second groove for receiving a third tube. A first side wall separates the first and the second grooves, and a second side wall separates the second and the third grooves. The first and the second side walls each are relatively thin which facilitates deformation in a radial direction in response to differential thermal expansion of the end cap in relation to the tubes. In addition, the side walls compress in a circumferential direction in response to differential thermal expansion of the end cap in relation to the tubes. An annular flange is positioned radially inward of the second side wall to facilitate centering the third tube in the third groove. The flange also deforms in a radial direction in response to differential thermal expansion of the end cap in relation to the third tube. A gasket, positioned within each groove, is subjected to an axial sealing force from the respective tube. The gaskets each have a rectangular cross-section.

20 Claims, 6 Drawing Sheets

END CAP FOR PROVIDING A FLUID-TIGHT SEAL BETWEEN DISSIMILAR MATERIALS

CROSS REFERENCE TO RELATED APPLICATIONS

This application claims the benefit of U.S. Provisional Patent Application No. 60/035,479, filed Jan. 13, 1997 and incorporated herein by reference.

BACKGROUND OF THE INVENTION

The present invention relates generally to end caps, and more particularly to axially-sealed, end caps which provide fluid-tight seals between dissimilar materials.

In industries such as chemical processing and semiconductor manufacturing, corrosion resistant processing and manufacturing equipment is essential. For example, ultra-pure de-ionized (UPDI) water—a corrosive liquid—is heated for use in manufacturing semiconductor devices. Thus, the equipment used for heating UPDI water must be capable of withstanding the corrosive effects of the UPDI water that flows therethrough.

Quartz has been used extensively for constructing process equipment in the semiconductor industry. One reason is that quartz is chemically resistant to most process fluids, including UPDI water. However, conventional quartz UPDI water heating systems are generally unreliable and expensive to operate because they tend to develop fluid leaks, and must therefore be continually serviced. More specifically, forming reliable fluid-tight seals between dissimilar components (e.g., quartz and plastic) of UPDI water heaters has been a problem.

Accordingly, it has been considered desirable to develop a new and improved end cap for providing a fluid-tight seal between dissimilar materials which meets the above-stated needs and overcomes the foregoing difficulties and others while providing better and more advantageous results.

SUMMARY OF THE INVENTION

In accordance with one embodiment of the present invention, a new and improved end-cap for use with a fluid heater is provided. The end-cap includes an end wall, a first groove in the end wall for receiving a first tube, a second groove in the end wall radially inward of the first groove for receiving a second tube, and a third groove in the end wall radially inward of the second groove for receiving a third tube. A first side wall separates the first and the second grooves, and a second side wall separates the second and the third grooves. The first and the second side walls each have a thickness which facilitates deformation in a radial direction in response to thermal expansion of the end cap.

In accordance with a second embodiment of the present invention, a new and improved end-cap is provided. The end-cap provides a fluid-tight seal between two dissimilar materials and includes a base portion formed from a first material. A number of annular grooves in the base portion receive tubes formed from a second material. A number of gaskets, each positioned within one of the grooves, are subjected to an axial sealing force from the tubes. The gaskets each have a rectangular cross-section. A portion of the end-cap deforms in response to differential thermal expansion between the tubes and the end-cap to prevent damage to the tubes.

One advantage of the present invention is the provision of a new and improved end-cap which provides a fluid-tight seal between dissimilar materials.

Another advantage of the present invention is the provision of an end-cap which compensates for differential thermal expansion between dissimilar materials.

Still another advantage of the present invention is the provision of an end-cap which utilizes gaskets having rectangular cross-sections in order to provide a stable base for tube ends which are seated on the end cap.

Yet another advantage of the present invention is the provision of an end-cap with thinned side walls that deform relatively easily in response to thermal expansion to prevent damage to components joined thereto.

A further advantage of the present invention is the provision of an end-cap with side walls having spaced voids which allow the side walls to compress in response to thermal expansion to prevent damage to components joined thereto.

A still further advantage of the present invention is the provision of an end-cap which can be used with different types of fluid heaters.

Yet further advantages of the present invention will become apparent to those of ordinary skill in the art upon reading and understanding the following detailed description of the preferred embodiment.

BRIEF DESCRIPTION OF THE DRAWINGS

The invention may take form in various components and arrangements of components and in various steps and arrangement of steps. The drawings are only for purposes of illustrating a preferred embodiment of the present invention and are not to be construed as limiting the invention.

DETAILED DESCRIPTION OF THE PREFERRED EMBODIMENT

Figure 1:
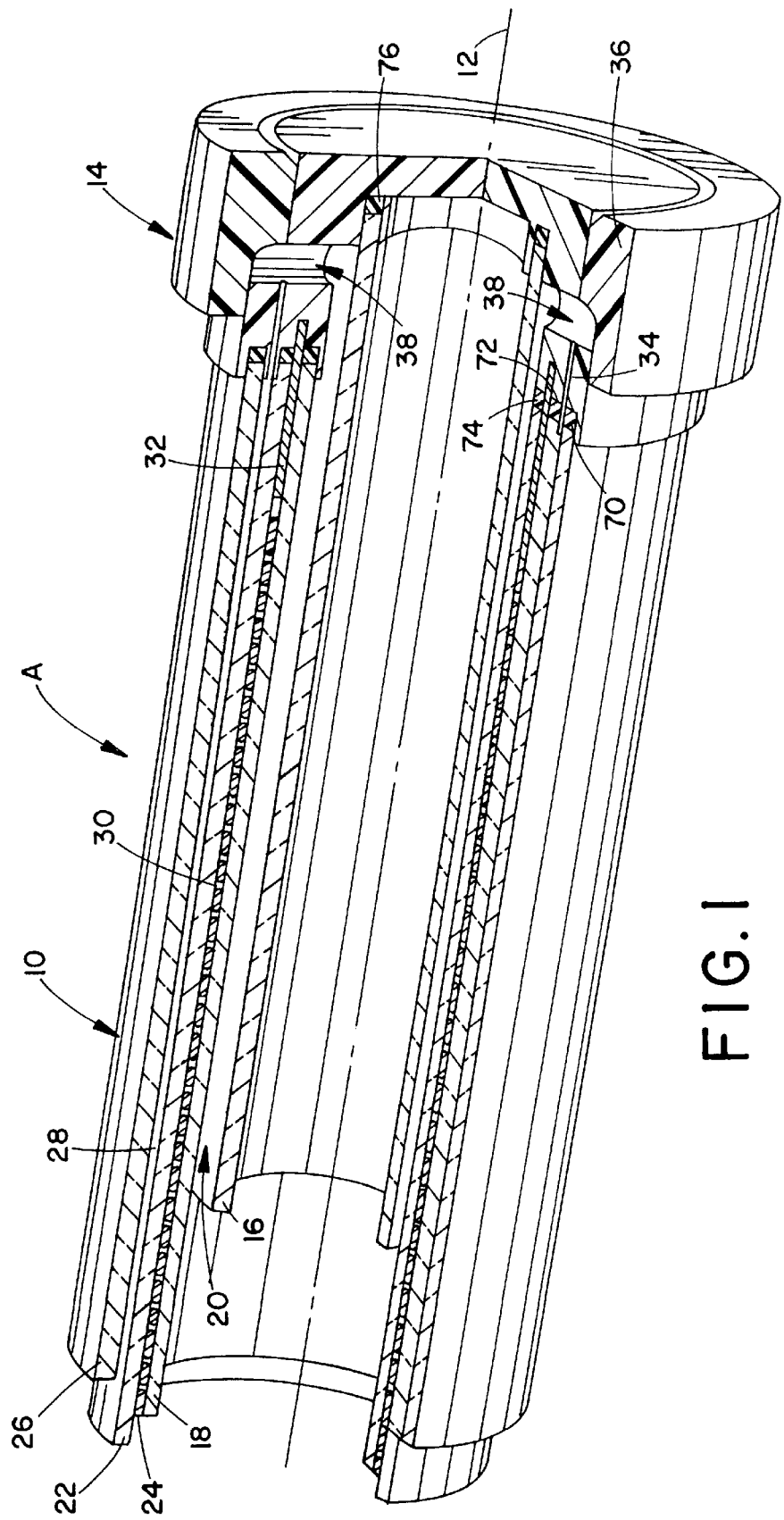
FIG. 1 is a perspective view, partially cut away, of a first end-cap assembly according to the present invention as joined to one end of an exemplary fluid heater.

Referring now to the drawings which show a preferred embodiment of the present invention only, and are not to be construed as limiting the same, FIG. 1 illustrates an exemplary fluid heater portion A for use in heating an operating medium such as UPDI water. The fluid heater portion A includes an intermediate body portion 10 having a central longitudinal axis 12 extending therethrough. An end-cap assembly 14 of the present invention is secured to a first end of the intermediate body portion 10. As described in greater detail below, the end cap assembly 14 cooperates with the intermediate body portion 10 to form a fluid-tight seal to prevent operating fluid from leaking from the fluid heater.

The fluid heater portion A is formed from a number of concentrically arranged spaced-apart quartz tubes. In particular, an inner quartz tube 16 is spaced radially inwardly from an inner heating element quartz tube 18 to define a first or inner annular fluid pathway 20 for carrying an operating fluid. The inner heating element tube 18 is spaced radially inwardly from an outer heating element quartz tube 22 to receive a heating element assembly 24 therebetween. The outer heating element tube 22 is spaced radially inwardly from an outer quartz tube 26 to define a second or outer annular fluid pathway 28 for carrying operating fluid received from the inner fluid pathway 20. The intermediate body portion 10 may also include an outer stainless-steel shell (not shown) surrounding the outer tube 26 with insulation, such as high-temperature closed cell foam insulation, interposed between the outer tube 26 and the outer shell.

The heating element assembly 24 includes an insulated, resistive, "ribbon" wire 30 spirally wound around the inner heating element tube 18. A conductive ring 32, preferably formed from copper, is secured over the exterior end surface of the inner heating element tube 18. A free end of the resistive wire 30 is brazed, or otherwise joined to the conductive ring 32 to form an electrical connection thereto. It should be appreciated by those of ordinary skill in the art that the heating element assembly 24 may include a quartz halogen radiant bulb in place of the resistive wire 30.

Figure 4:
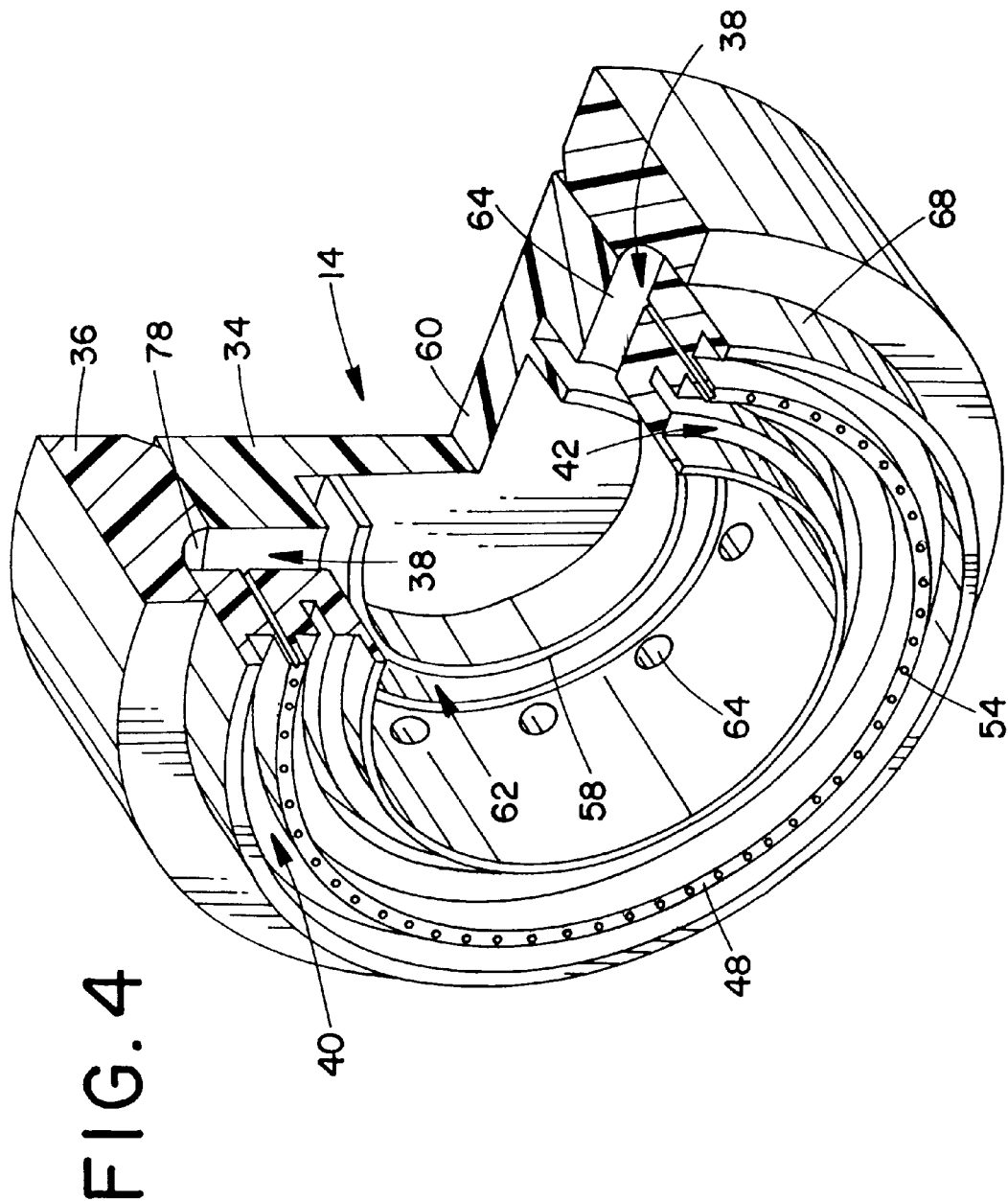
FIG. 4 is a perspective view, partially cut away, of the first end cap assembly of FIG. 1.

With continuing reference to FIG. 4, the end-cap assembly 14 includes an intermediate end cap 34 and a manifold cap 36 at least partially surrounding a portion of the intermediate end cap 34. The intermediate end cap 34 and the manifold cap 36 cooperate to define an annular fluid manifold 38 which conveys operating fluid from the inner fluid pathway 20 to the outer fluid pathway 28, as shown in FIG. 1. The intermediate end cap 34 and the manifold cap 36 are preferably formed from a plastic material capable of resisting corrosive fluids such as polyvinylidene fluoride (PVDF) which is commercially available under the trade name KYNAR from ELF Atochem North America Inc., and is commercially available under the trade name SYGEF from George Fisher Corporation.

Figure 2:
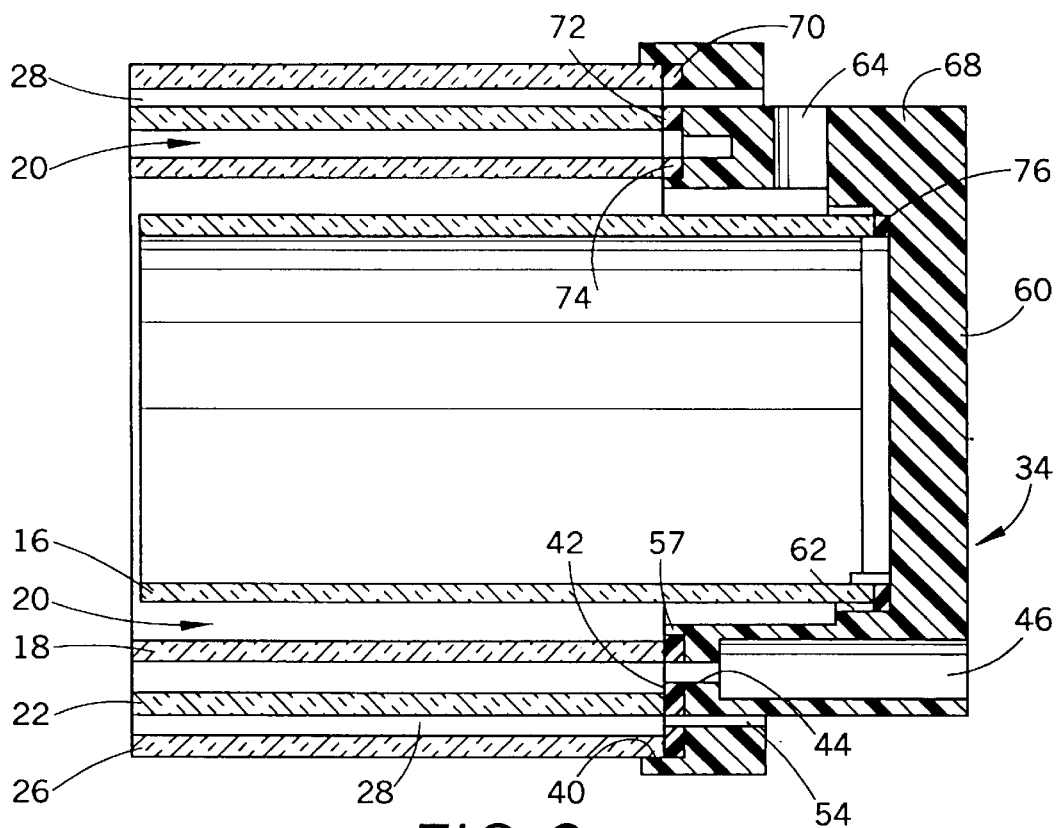
FIG. 2 is a longitudinal sectional view of an intermediate end-cap of the end-cap assembly of FIG. 1.
Figure 3:
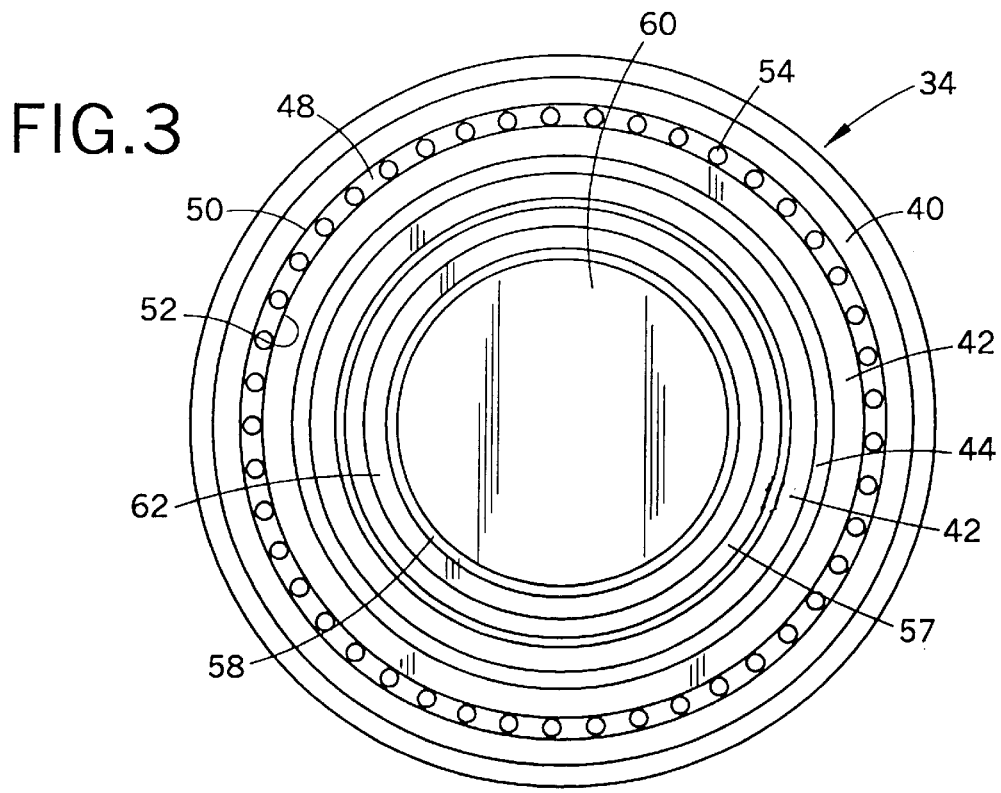
FIG. 3 is a bottom end view of the intermediate end-cap of FIG. 2.

With reference now to FIGS. 2 and 3, the intermediate end cap 34 includes a first annular groove 40 for receiving an end portion of the outer quartz tube 26 when the end-cap assembly 14 is secured to the intermediate body portion 10. A second annular groove 42 is spaced radially inwardly of the first annular groove 40 and receives an end portion of the outer heating element tube 22, heating element assembly 24 (FIG. 1), and inner heating element tube 18.

An annular slot 44 extends axially from an end wall of the second annular groove 42 for receiving an end portion of the conductive ring 32 therethrough. A portion of the annular slot 44 communicates with a power access port 46. An electrical lead (not shown) extends from the conductive ring 32 through the power access port 46 to provide an electrical connection to the heating element assembly 24.

A common annular wall 48 defines a radially inner surface 50 of the first groove 40 and a radially outer surface 52 of the second groove 42. A plurality of circumferentially spaced-apart bores 54 extend axially through the common annular wall 48. The circumferential spacing of the bores 54 around the outer fluid pathway 28 permits an even, annular, fluid flow through the outer fluid pathway thus preventing stagnant areas within the outer fluid pathway where sediment deposition may occur.

The end-cap assembly 14 minimizes, or otherwise compensates for the effects of differential thermal expansion between the plastic end cap assembly 14 and the quartz tubes 16, 18, 22 and 26, in order to eliminate fluid leaks. In particular, the bores 54 are circumferentially spaced-apart in close proximity to one another to reduce the amount of plastic material in the wall portion between adjacent bores 54. By reducing the amount of material the wall portion can more easily flex to accommodate the differential thermal expansion between the intermediate end cap 34 and the quartz tubes. Also, because of the adjacent bores 54, the wall 48 can be compressed against the adjacent tube to prevent the plastic material of the end cap 34 from expanding in a radial direction (due to thermal expansion) to such an extent as to cause damage (e.g., cracking) to one or more of the quartz tubes.

Figure 5:
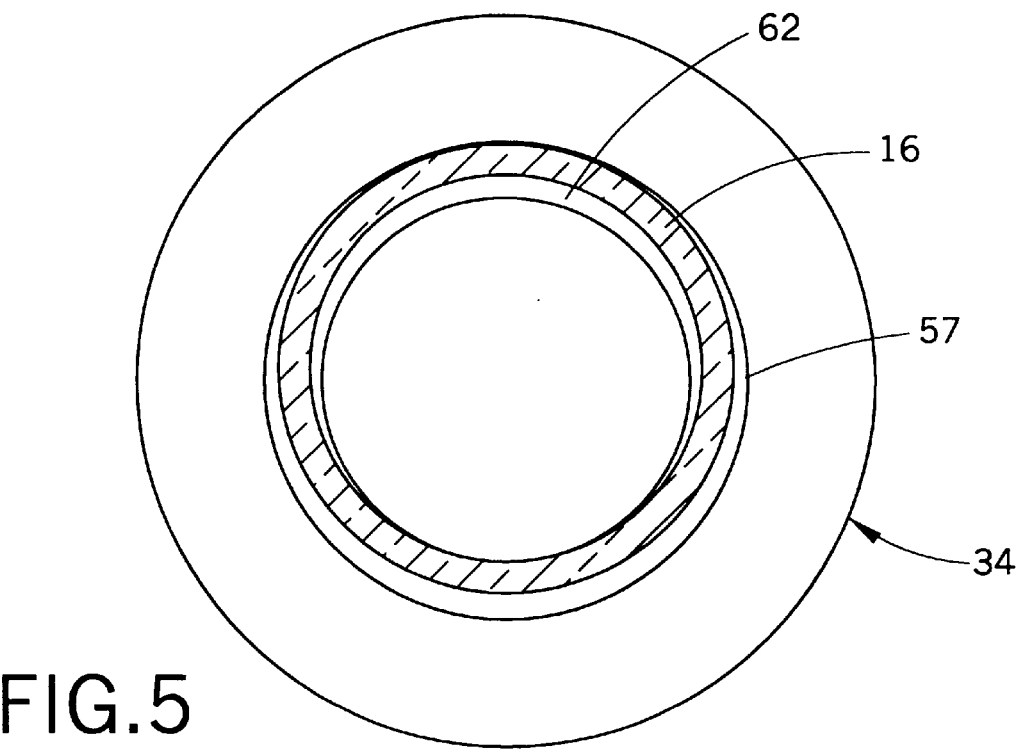
FIG. 5 is a bottom end view of a quartz fluid heater tube in contact with a prior art end-cap.
Figure 6:
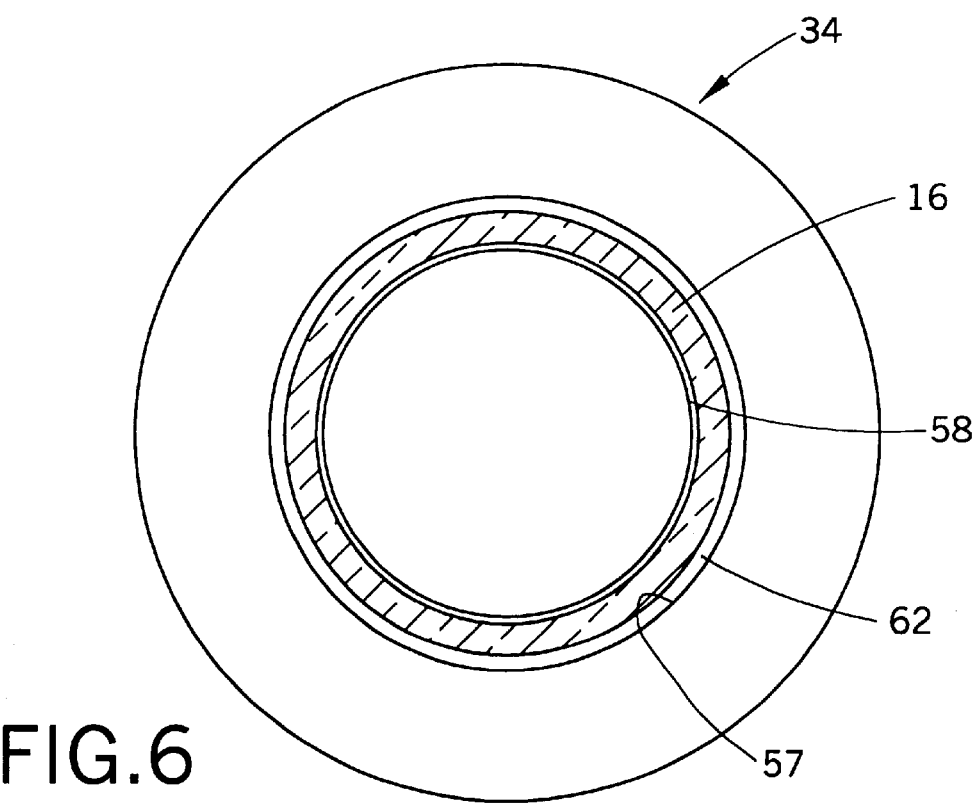
FIG. 6 is a bottom end view of a quartz fluid heater tube in contact with the intermediate end-cap of FIG. 2.

A central recess 56 is defined radially inwardly of the second annular groove 42. A contoured side wall 57 separates the second annular groove 42 from the central recess 56. An annular flange 58 extends axially from an end wall 60 of the central recess 56. The annular flange 58 is spaced radially inwardly from the contoured side wall 57 to define a third annular groove 62 for receiving an end portion of the inner tube 16. As best seen in FIG. 6, the flange 58 insures that the inner tube 16 centers in the groove 62 to prevent damage to the inner quartz tube 16 from potential radial expansion of the end cap under thermal loading conditions. Referring to FIG. 5, without the flange 58, the quartz tube may not center in the groove 62 thereby contacting the side wall 57. Subsequent thermal expansion of the end cap 34, and more particularly, radial expansion of the side wall 57 may cause the quartz tube to fracture, or may stress the quartz tube eventually causing premature failure.

Typically, the width of each groove 40, 42, and 62 incorporates sufficient tolerance to compensate for the thermal expansion of the plastic end cap 14 relative to the quartz tubes. However, if a quartz tube is slightly oval, or is not perfectly centered in the end cap, the expansion of the end cap 14 may cause the quartz tube to break. In order to further compensate for the effects of differential thermal expansion between the plastic end cap assembly 14 and the quartz tubes, the side walls and flanges (e.g., 57, 58) defining the first, second, and third annular grooves 40, 42, and 62 are radially thinned to permit the walls/flanges to buckle or deform during thermal expansion of the end-cap assembly 14 without imparting an excessive radial force on the quartz tubes, because excessive radial force may damage the tubes.

As mentioned above, the quartz material forming the tubes 16, 18, 22 and 26, and the plastic material forming the end-cap assembly 14, both resist the corrosive effects of an operating fluid such as UPDI. But, the plastic material (i.e. PVDF) forming the end-cap assembly 14 has a first rate of thermal expansion, and the quartz material forming the tubes 16, 18, 22, and 26 has a second rate of thermal expansion different from the first rate of thermal expansion of the plastic material.

The different rates of thermal expansion are compensated for, in part, by the particular design of the end-cap assembly 14, and in part, by the use of gaskets having a particular cross-section, as described further below. It should be appreciated, however, that other materials having corrosion resistant properties could be used to form the tubes and end-cap assembly. For instance, depending upon the corrosivity of the operating fluid being heated, the tubes and/or end-cap assembly could be formed from materials such as glass, metal, stainless steel, elastomers, etc.

Referring again to FIG. 2, a plurality of circumferentially spaced-apart cross bores 64 extend radially outwardly through the side wall 57. The cross bores 64 permit the inner fluid path 20 to communicate with a contoured exterior surface 68 of the intermediate end cap 34 and hence the outer fluid path 28 when the end-cap assembly 14 is joined to the intermediate body portion 10. In the embodiment being described, there are eleven (11) cross bores 64 spaced circumferentially apart. The circumferential spacing of the cross bores 64 between the inner and outer fluid pathways 20, 28 permit an even, annular, fluid flow thus preventing stagnant areas within the fluid pathways where sediment deposition may occur. It should be appreciated that any desired number of cross bores can be used.

As best seen in FIGS. 1 and 2, a first gasket 70 is positioned within the first groove 40. A second and a third gasket 72, 74 are positioned within the second groove 42. A fourth gasket 76 is positioned within the third annular groove 62. The gaskets 70–76 are rectangular in cross-section and resiliently abut an end of the respective quartz tubes 16, 18, 22, and 26 to form fluid-tight seals in the presence of an axial sealing or loading force created when the end-cap assembly 14 is secured to the intermediate body portion 10. The gaskets may be axially loaded by welding, or otherwise joining a stainless-steel flange (not shown) to the outer shell.

The gaskets 70–76 are preferably formed from a conventional fluroelastomeric material. It should be appreciated that the gaskets between the quartz glass tubes and the plastic intermediate end cap 34 minimize the potential for fluid leaks by permitting differential thermal expansion of the quartz glass tubes and the plastic intermediate end cap 34, and by preventing side loading of the quartz tubes.

In particular, the rectangular or square cross-section of the gaskets 70–76 specifically compensates for any inherent ovality of the quartz tubes. Such ovality of the quartz tubes facilitates fluid leaks when axially loading a conventional O-ring (having a circular cross-section). That is, if the axial loading of a conventional O-ring is off-center, a side loading of the quartz tube develops, causing premature failure of the quartz tube. By using a gasket with a rectangular cross-section, the axial loading imparted by the quartz tubes is uniform across the entire sealing surface thereof.

Referring again to FIG. 4, the manifold cap 36 includes an annular arcuate surface 78 which cooperates with the contoured exterior surface 68 of the intermediate end cap 34 to define the fluid manifold 38 when the manifold cap 36 is joined to the intermediate end cap 34. It should be appreciated that the cross bores 64 extend radially between, and communicate with, the inner fluid pathway 20 and the fluid manifold 38. The bores 54 extend axially through the common annular wall 48 to permit communication between the fluid manifold 38 and the outer fluid pathway 28.

Figure 7:
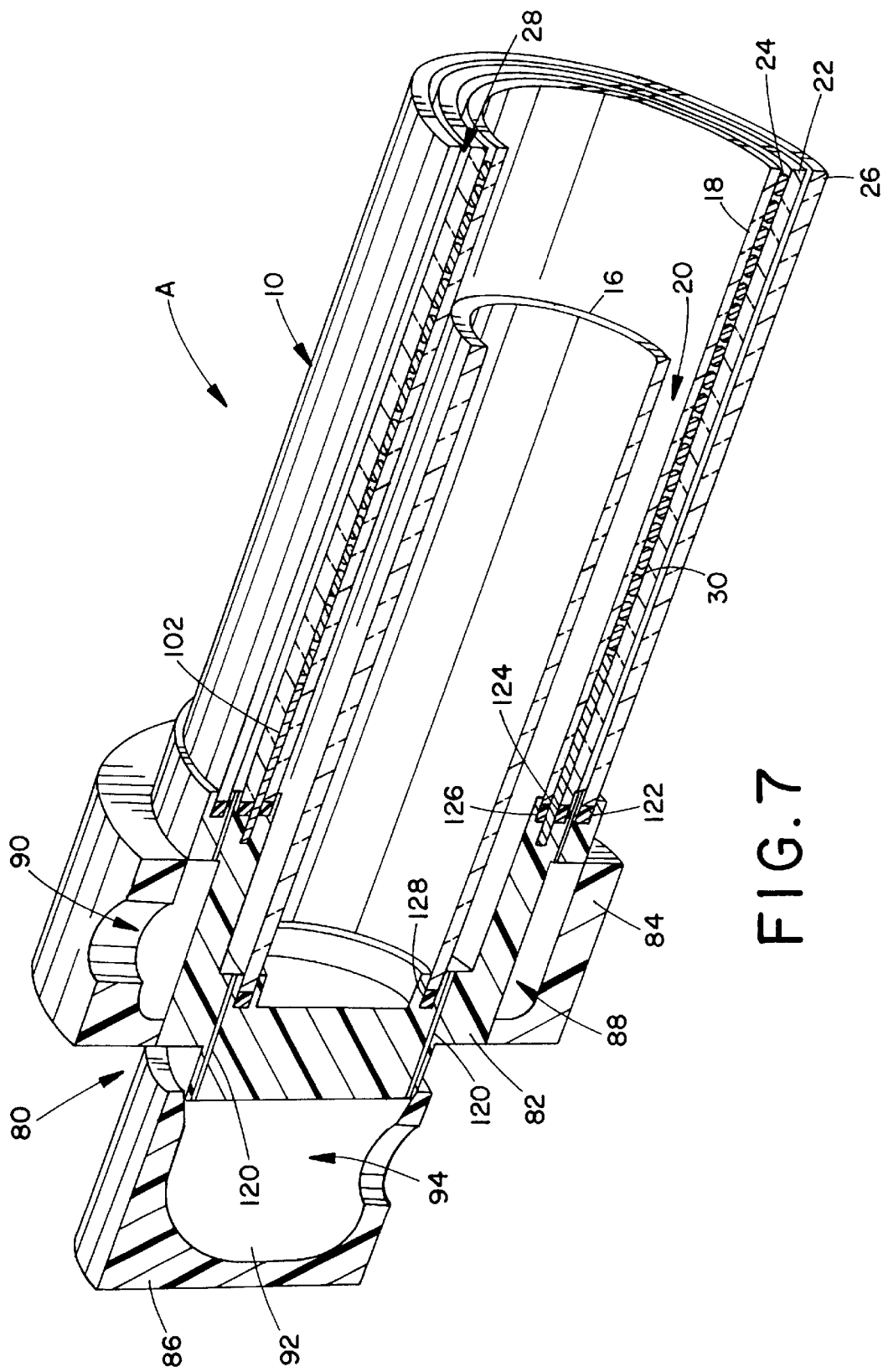
FIG. 7 is a perspective view in longitudinal section through a second end-cap assembly when it is assembled to a second end of the fluid heater of FIG. 1.
Figure 8:
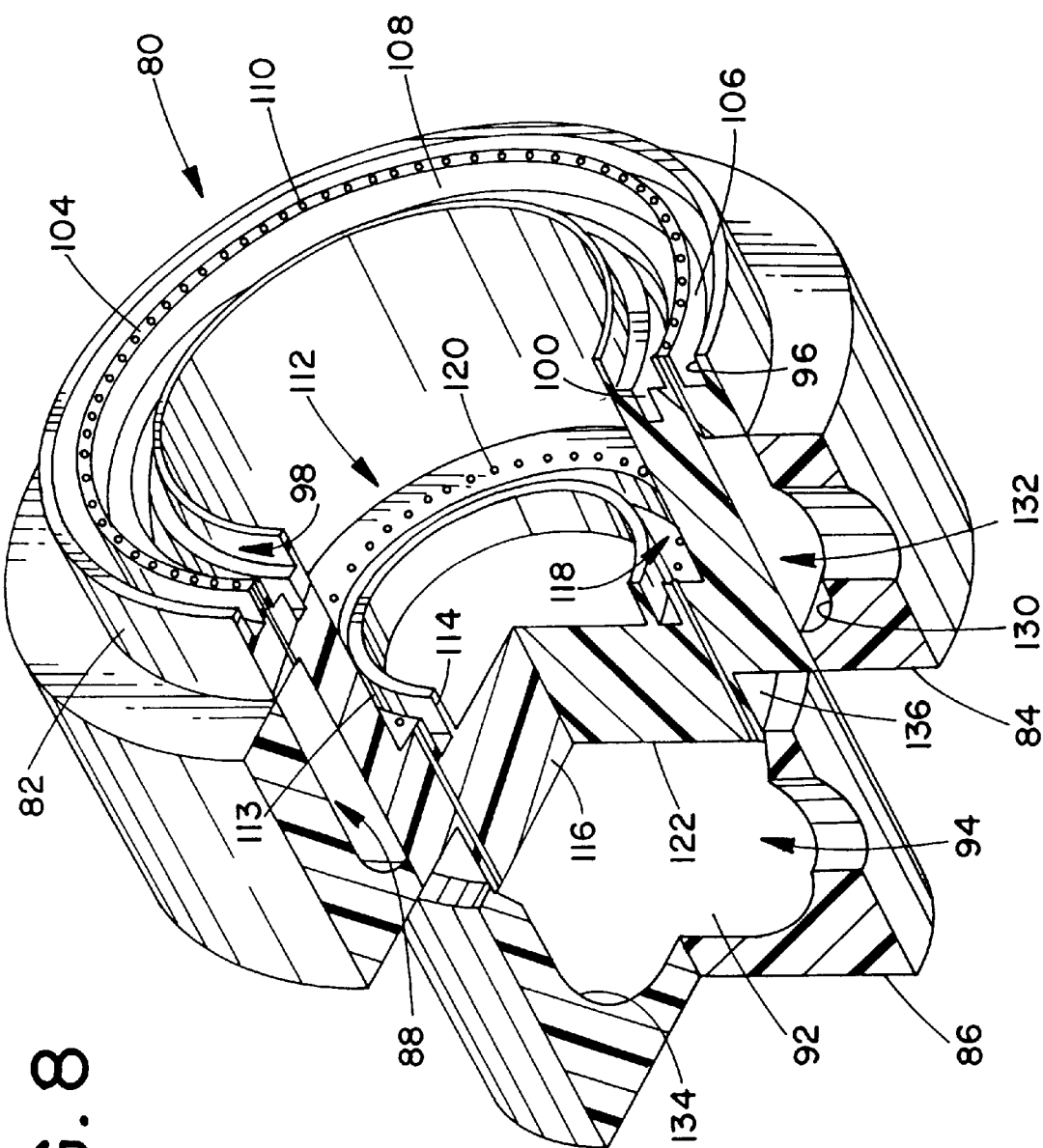
FIG. 8 is perspective view, partially cut away of the second end-cap assembly as shown in FIG. 7.

Referring now to FIGS. 7 and 8, a second end-cap assembly 80 in accordance with the present invention is shown secured to a second end of the intermediate body portion 10 of the fluid heater A. The end-cap assembly 80 includes an intermediate end cap 82, a manifold cap 84 at least partially surrounding a first portion of the intermediate end cap 82, and an inlet cap 86 at least partially surrounding a second portion of the intermediate end cap 82. The intermediate end cap 82 and the manifold cap 84 cooperate to define an annular outlet manifold 88 which conveys heated fluid from the outer fluid pathway 28 to an outlet port 90. The intermediate end cap 82 and the inlet cap 86 cooperate to define an inlet manifold 92 which conveys operating fluid to be heated from an inlet port 94 to the inner fluid pathway 20. The intermediate end cap 82, manifold cap 84, and inlet cap 86 are similarly formed from a plastic material such as PVDF.

The intermediate end cap 82 includes a first annular groove 96 for receiving an end portion of the outer quartz tube 26 when the end cap assembly 80 is secured to the intermediate body portion 10. A second annular groove 98 is spaced radially inwardly of the first annular groove 96 and receives end portions of the outer heating element tube 22, the heating element assembly 24, and inner heating element tube 18.

An annular slot 100 extends axially from an end wall of the second annular groove 98. A portion of the annular slot 100 communicates with a power access port (not shown) of the end-cap assembly 80. The annular slot 100 receives an end portion of a conductive (preferably copper) ring 102 therein. The conductive ring 102 is secured over an exterior end surface of the inner heating element tube 18. A free end of the resistive wire 30 is brazed, or otherwise joined to the conductive ring 102 to form an electrical connection thereto. An electrical lead (not shown) extends through the power access port to the conductive ring 102 to provide an electrical connection to the resistive wire 30.

A common annular wall 104 defines a radially inner surface 106 of the first annular groove 96 and a radially outer surface 108 of the second annular groove 98. A plurality of circumferentially spaced-apart bores 110 extend axially through the common annular wall 116. The circumferential spacing of the bores 110 around the outer fluid pathway 28 permits an even, annular, fluid flow through the outer fluid pathway 28 thus preventing stagnant areas within the outer fluid pathway where sediment deposition may occur.

A central recess 112 is defined radially inwardly of the second annular groove 98. A contoured side wall 113 separates the second annular groove 98 from the central recess 112. An annular flange 114 extends axially from an end wall 116 of the central recess 112. The annular flange 114 is spaced radially inwardly from the contoured side wall 113 to define a third annular groove 118 for receiving an end portion of the inner quartz tube 16. The flange 114 insures that the inner quartz tube 16 centers in the groove 118 to prevent damage to the inner quartz tube from potential radial expansion of the end cap under thermal loading conditions. Without the flange 114, the quartz tube may not center in the groove 118, and subsequent thermal expansion of the end cap, and more particularly, radial expansion of the side wall 113 may cause the quartz tube to fracture.

Typically, the width of each groove 96, 98, and 118 incorporates sufficient tolerance to compensate for the thermal expansion of the plastic end cap 82 relative to the quartz tubes. However, if a quartz tube is slightly oval, or is not perfectly centered in the end cap, the expansion of the end cap 82 may cause the quartz tube to break. In order to further compensate for the effects of differential thermal expansion between the plastic end cap assembly 82 and the quartz tubes, the side walls and flanges (e.g., 104, 113, 114, etc.) defining the first, second, and third annular grooves 96, 98, and 118 are radially thinned to permit the walls to buckle or deform during thermal expansion of the end-cap 82 without imparting excessive radial forces on the quartz tubes, because such excessive radial forces may damage the tubes.

While all the tubes are shown to be quartz tubes, it should be appreciated that the several tubes could be made of different materials if so desired. Even so, the relatively thin side walls and flanges of the end cap would allow the end cap to accommodate the differential thermal expansion which would take place between the several tubes as well as between the end cap and the tubes.

A plurality of circumferentially spaced-apart bores 120 extend axially from the end wall 116. The bores 120 are spaced radially outwardly of the groove 118. The bores 120 permit the central recess 112 to communicate with an end surface 122 of the intermediate end cap 82. The circumferential spacing of the bores 120 around the whole inner fluid pathway 20 permits an even annular fluid flow through the inner fluid pathway 20 thus preventing stagnant areas within the inner fluid pathway where sediment deposition may occur.

As with the end-cap assembly 14, the end-cap assembly 80 minimizes, or otherwise compensates for the effects of differential thermal expansion between the plastic end cap assembly 80 and the quartz tubes, in order to eliminate fluid leaks. In particular, the bores 110, 120 are circumferentially spaced-apart in close proximity to one another to reduce the circumferential length of the intermediate wall portions between adjacent bores 110, 120. By reducing the circumferential length, the intermediate wall portions can be readily compressed in a circumferential direction by the adjacent quartz tubes in response to differential thermal expansion of the end cap 82 in relation to the quartz tubes. Compression of the intermediate wall portions in a circumferential direction prevents the end cap 82 from expanding in a radial direction which may cause damage (e.g., cracking) to one or more of the quartz tubes.

As shown in FIG. 7, a first gasket 122 is positioned within the groove 96. A second and a third gasket 124, 126 are positioned within the second groove 98. A fourth gasket 128 is positioned within the third annular groove 118. The gaskets 122–128 are rectangular in cross-section and resiliently abut the respective quartz tubes 16, 18, 22, and 26 to form fluid-tight seals in the presence of an axial sealing or loading force created when the end-cap assembly 80 is secured to the intermediate body portion 10. The gaskets may be axially loaded by welding, or otherwise joining a stainless-steel flange (not shown) to the outer shell.

The gaskets 122–128 are preferably formed from a conventional fluroelastomeric material. It should be appreciated that the gaskets between the quartz glass tubes and the plastic intermediate end cap 82 minimize the potential for fluid leaks by permitting differential thermal expansion of the quartz glass tubes and the plastic intermediate end cap 82, and by preventing side loading of the quartz tubes. In particular, the rectangular or square cross-section of the gaskets 122–128 specifically compensates for any inherent ovality of the quartz tubes by providing flat sealing surface so that the axial loading imparted by the quartz tubes is uniform across the entire surface thereof.

As shown in FIG. 8, the manifold cap 84 includes an annular arcuate surface 130 which cooperates with an exterior side surface 132 of the intermediate end cap 82 to define the outlet manifold 88 when the manifold cap 84 is joined to the intermediate end cap 82. It should be appreciated that the bores 110 extend axially through the common annular wall 104 to the outlet manifold 88.

The inlet cap 86 includes a cylindrical cavity 134 which defines the inlet manifold 92. The cavity 134 has an inner diameter at a free end thereof which is slightly greater than an outer diameter of a cylindrical exterior surface 136 of the intermediate end cap 82. The bores 120 extend axially between the central recess 112 and the inlet manifold 92 when the manifold cap 86 is joined to the intermediate end cap 82.

An axial sealing force may be imparted to the gaskets 122–128 by joining one or more welded flanges of the outer shell (not shown) with an axially opposing retaining flange (not shown) of the end-cap assembly 80. In particular, a retaining flange of the end-cap assembly may have a central bore therethrough which surrounds the cylindrical exterior surface portion 136 of the intermediate end cap 82, surrounds at least a portion of the inlet cap 86, and abuts against an end surface of the manifold cap 84. A number of assembly bolts may join the retaining flange to the outer shell weld flanges so as to impart an axial compressive or sealing force to the end-cap assembly 80.

It should be appreciated by those of ordinary skill in the art that the end-cap assemblies 14, 80 may be used in conjunction with other types of fluid heaters, than the quartz heater disclosed, such as fluid heaters incorporating polytetrafluoroethylene (e.g., Teflon) lined or coated cylindrical tubes.

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. An end-cap comprising:
    an end wall;
    a first groove in said end wall receiving a first associated tube;
    a second groove in said end wall located radially inward of the first groove receiving a second associated tube;
    a third groove in said end wall located radially inward of the second groove receiving a third associated tube;
    a first side wall separating said first and said second grooves; and
    a second side wall separating said second and said third grooves, wherein said first and said second side walls are relatively thin to facilitate deformation in a radial direction in response to differential thermal expansion of the end cap in relation to the associated tubes.

2. The end-cap of claim 1, further including an annular flange located radially inward of the second side wall to facilitate centering the third associated tube in said third groove, said flange deforming in a radial direction in response to differential thermal expansion of the end cap in relation to the third associated tube.

3. The end-cap of claim 1, further including a first gasket contacting the first associated tube within said first groove, a second gasket contacting the second associated tube within said second groove, and a third gasket contacting the third associated tube within said third groove, said gaskets each having a rectangular cross-section.

4. The end-cap of claim 1, further including:
    a first plurality of circumferentially spaced-apart bores extending axially through said first side wall and said end wall with adjacent bores defining first intermediate wall portions;
    a second plurality of circumferentially spaced-apart bores extending axially through said end wall between the second associated tube and the third associated tube with adjacent bores defining second intermediate wall portions; and
        said first and said second intermediate wall portions compressing in a circumferential direction in response to differential thermal expansion of the end cap in relation to the associated tubes.

5. The end-cap of claim 4, further including:

a manifold cap surrounding a first portion of said end wall to define a first manifold, said first plurality of bores communicating with said first manifold; and an end cap surrounding a second portion of said end wall to define a second manifold, said second plurality of bores communicating with said second manifold.

6. The end-cap of claim 1, further including:

a plurality of cross bores extending radially outward from said second side wall; and a plurality of circumferentially spaced-apart bores extending axially through said first side wall to communicate with said cross bores.

7. The end-cap of claim 6, further including a manifold cap surrounding a first portion of said end wall to define a first manifold, said first plurality of cross bores communicating with said first manifold.

8. The end-cap of claim 1, wherein said base is formed from a plastic material and the associated tubes are formed from a quartz material.

9. The end-cap of claim 8, wherein said plastic material is polyvinylidene fluoride.

10. The end-cap of claim 1, wherein said base is formed from a plastic material and the associated tubes are lined with a polytetrafluoroethylene material.

11. The end-cap of claim 1, wherein said base is formed from a first material and the associated tubes are formed from a second material having a coefficient of thermal expansion different from the first material.

12. An end-cap for providing a fluid-tight seal between two dissimilar materials, the end-cap comprising:

a base portion formed from a first material;

a plurality of annular grooves located in said base portion each receiving an end portion of a tube formed from a second material;

a plurality of gaskets each positioned within a respective one of said grooves, each gasket being subjected to an axial sealing force from a respective one of said tubes, said gaskets each having a rectangular cross-section; and a portion of the end cap being configured for deforming in response to differential thermal expansion between said tubes and the end-cap in order to prevent damage to said tubes.

13. The end-cap of claim 12, wherein said portion includes a first side wall defining one of said grooves, said first side wall having a thickness which facilitates deforming in response to thermal expansion.

14. The end-cap of claim 13 wherein said portion further includes a second side wall defining another one of said grooves, said second side wall having a thickness which facilitates deforming in response to thermal expansion.

15. The end-cap of claim 14, wherein said first and second side walls further circumferentially compress in response to differential thermal expansion of the end-cap in relation to said tubes in order to prevent damage to said tubes.

16. An end-cap assembly for providing a fluid-tight seal between two dissimilar materials, the end-cap assembly comprising:

a base portion formed from a first material having a first coefficient of thermal expansion;

a pair of concentric tubes formed from a second material having a second coefficient of thermal expansion;

first and second annular grooves located in said base portion each receiving an end portion of a respective tube;

a side wall being defined between said first and second annular grooves, said side wall having a plurality of circumferentially spaced holes for permitting an operating fluid to pass therethrough; and wherein portions of said side wall between adjacent holes are configured to deform in response to differential thermal expansion between said tubes and said base portion in order to prevent damage to said tubes.

17. The end-cap assembly of claim 16, wherein said portions of said side wall between adjacent holes compress in response to differential thermal expansion between said tubes and said base portion.

18. The end-cap assembly of claim 16, further including:

a third groove located in said base portion and receiving an end portion of a third tube formed from said second material; and a second side wall separating said second and said third grooves, wherein said second side wall is relatively thin to facilitate deformation in a radial direction in response to differential thermal expansion of the end cap in relation to the adjacent tubes.

19. The end-cap assembly of claim 16, wherein said base portion is formed from a plastic material and the tubes are formed from a quartz material.

20. The end-cap assembly of claim 16, further including first and second gaskets each positioned within a respective one of said first and second grooves, each gasket being subjected to an axial sealing force from a respective one of said tubes, said gaskets each having a rectangular cross-section.

* * * * *